(12) United States Patent
Dewan et al.

(10) Patent No.: US 10,866,909 B2
(45) Date of Patent: Dec. 15, 2020

(54) TECHNOLOGIES FOR PROTECTING VIRTUAL MACHINE MEMORY

(71) Applicant: Intel Corporation, Santa Clara, CA (US)

(72) Inventors: Prashant Dewan, Hillsboro, OR (US); Uttam K. Sengupta, Portland, OR (US); Siddhartha Chhabra, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 298 days.

(21) Appl. No.: 15/633,259

(22) Filed: Jun. 26, 2017

(65) Prior Publication Data

US 2018/0373647 A1    Dec. 27, 2018

(51) Int. Cl.
| | |
|---|---|
| G06F 12/14 | (2006.01) |
| G06F 12/1027 | (2016.01) |
| G06F 12/1009 | (2016.01) |
| G06F 12/109 | (2016.01) |
| G06F 12/10 | (2016.01) |
| G06F 12/1036 | (2016.01) |

(52) U.S. Cl.
CPC ............ G06F 12/145 (2013.01); G06F 12/10 (2013.01); G06F 12/1009 (2013.01); G06F 12/109 (2013.01); G06F 12/1027 (2013.01); G06F 12/14 (2013.01); G06F 12/1036 (2013.01); *G06F 2212/1052* (2013.01); *G06F 2212/651* (2013.01); *G06F 2212/657* (2013.01); *G06F 2212/68* (2013.01)

(58) Field of Classification Search
CPC .................................. G06F 12/10; G06F 12/14
See application file for complete search history.

(56) References Cited

U.S. PATENT DOCUMENTS

| 7,739,466 B2* | 6/2010 | Rozas | G06F 12/145 710/200 |
|---|---|---|---|
| 2007/0294496 A1* | 12/2007 | Goss | G06F 12/1408 711/163 |
| 2009/0222816 A1* | 9/2009 | Mansell | G06F 12/145 718/1 |

(Continued)

*Primary Examiner* — Charles Rones
*Assistant Examiner* — Tian-Pong Chang
(74) *Attorney, Agent, or Firm* — Jaffery Watson Mendonsa & Hamilton LLP

(57) ABSTRACT

Technologies for protecting virtual machine memory of a compute device include a virtual machine (VM) instantiated on the compute device, a virtual machine monitor (VMM) established on the compute device to control operation of the VM, a secured memory, and a memory manager. The memory manager receives a memory access request that includes a virtual linear address (LA) from the VM and performs a translation of the LA to a translated host physical address (HPA) of the compute device using one or more page tables associated with the VM and VMM. The memory manager determines whether a secured translation mapping of LA-to-HPA that corresponds to the LA is locked. If the mapping is locked, the memory manager verifies the translation based on a comparison of the translated HPA to a HPA translated using the secured translation mapping and, if verified, performs the memory access request using the translated HPA.

31 Claims, 8 Drawing Sheets

(56) References Cited

U.S. PATENT DOCUMENTS

| | | | | |
|---|---|---|---|---|
| 2013/0219143 A1* | 8/2013 | Bennett | ............... | G06F 9/45533 711/163 |
| 2014/0379956 A1* | 12/2014 | Chang | ................. | G06F 12/1027 711/6 |
| 2017/0091487 A1* | 3/2017 | Lemay | ................. | G06F 9/45533 |
| 2018/0183580 A1* | 6/2018 | Scarlata | ................ | G06F 21/602 |

* cited by examiner

TECHNOLOGIES FOR PROTECTING VIRTUAL MACHINE MEMORY

BACKGROUND

In cloud environments, host service devices are used to provide various cloud services to client devices. For increased efficiency and utilization, a host service device may host multiple services on the same device by utilizing virtual machines (VMs). Each VM provides a virtual "guest" device or machine for each hosted service such that the hosted service appears to be executed on an individual, dedicated device.

Virtual machines of a host service device may be managed by a virtual machine monitor (VMM). A typical VMM is embodied as a software program that controls the physical computer hardware (e.g., a processor, memory, communication devices, disk and CD-ROM drives, etc.) of the host service device and presents programs executing within the virtual machines (VM) with the illusion that the programs are executing on independent, physical computer hardware. Virtual memory used by programs executing in virtual machines may be mapped to physical memory of a host service device in various ways. However, in some cases, a host service device may be vulnerable to attacks by malware, viruses, and other types of malicious software that may attempt to compromise functions of the virtual machine monitor. The maliciously compromised virtual machine monitor may put virtual memory of the virtual machines instantiated on the host service device at risk.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
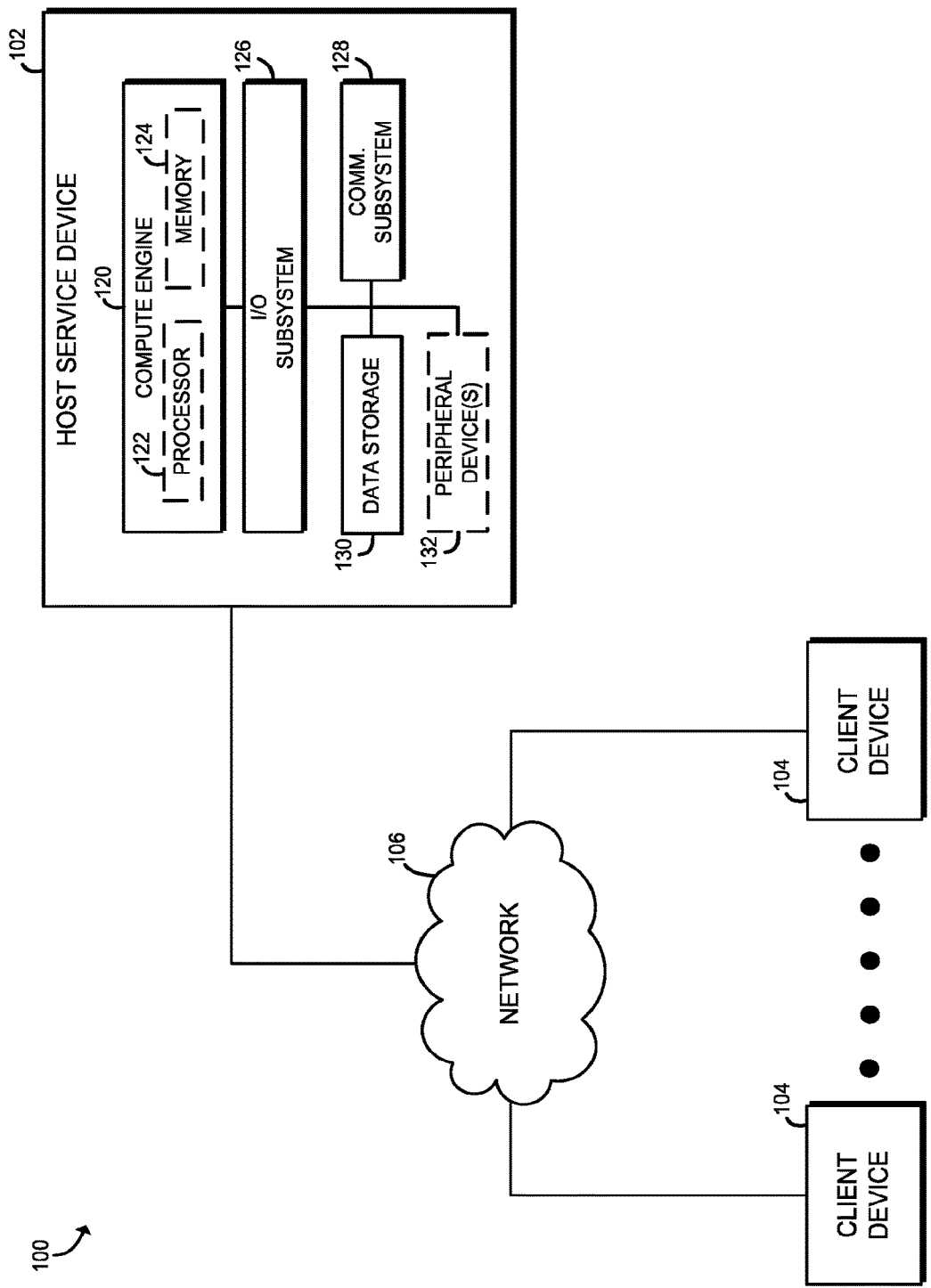
FIG. 1 is a simplified block diagram of at least one embodiment of a system for protecting virtual machine memory of a host service device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for protecting a virtual machine memory includes a host service device 102, which may communicate with one or more client devices 104 over a network 106 to provide various cloud or hosted services. In use, as described in more detail below, the host service device 102 configures a secured memory of the host service device 102 to protect virtual machine memory of virtual machine(s), which are controlled by a virtual machine monitor of the host service device 102. As discussed in more detail below, when a virtual machine is instantiated, the virtual machine monitor allocates a range of physical addresses (e.g., guest physical addresses) to the instantiated virtual machine. In the illustrative embodiment, a translation mapping of virtual addresses-to-physical addresses that corresponds to the physical address range allocated to the virtual machine is stored in the secured memory of the host service device 102 such that the secured translation mapping is not accessible to the virtual machine monitor. As such, even if the virtual machine monitor may be maliciously compromised or hacked, the secured translation mapping stored in the secured memory is not affected. Additionally, subsequent memory address translations may be verified by comparing such memory translations to the secured translation mapping.

The host service device 102 may be embodied as any type of computation or computer device capable of performing the functions described herein, including, without limitation, a computer, a server, a rack-mounted server, a high-performance computing node, a desktop computer, a workstation, a laptop computer, a notebook computer, a tablet computer, a mobile computing device, a wearable computing device, a network appliance, a distributed computing system, a processor-based system, and/or a consumer electronic device. As shown in FIG. 1, the host service device 102 illustratively includes a compute engine 120, an input/output ("I/O") subsystem 126, a data storage 130, and a communication subsystem 128. In some embodiments, the compute engine 120 may include or may be embodied as a processor 122 and integrated or separate memory 124 as discussed below. Additionally, in some embodiments, the host service device 102 may also include one or more peripheral devices 132. It should be appreciated that the host service device 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 122 in some embodiments.

The compute engine 120 may be embodied as any type of device or collection of devices capable of performing various compute functions as described below. In some embodiments, the compute engine 120 may be embodied as a single device such as an integrated circuit, an embedded system, a field-programmable-array (FPGA, a system-on-a-chip (SOC), or other integrated system or device. In some embodiments, the compute engine 120 includes or is embodied as the processor 122 and the memory 124. The processor 122 may be embodied as any type of processor capable of performing the functions described herein. For example, the processor 122 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the host service device 102 such as operating systems, applications, programs, libraries, and drivers. The memory 124 is communicatively coupled to the processor 122 via the I/O subsystem 126, which may be embodied as circuitry and/or components to facilitate input/output operations with the processor 122, the memory 124, and other components of the host service device 102. For example, the I/O subsystem 126 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 126 may be incorporated, along with the processor 122, the memory 124, and other components of the host service device 102, into the compute engine 120.

The communication subsystem 128 may be embodied as any type of communication circuit, device, or collection thereof, capable of enabling communications between the host service device 102 and other devices of the system 100 (e.g., the client devices 104 via the network 106). To do so, the communication subsystem 128 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The data storage 130 may be embodied as any type of device or devices configured for short-term or long-term storage of data such as, for example, memory devices and circuits, memory cards, hard disk drives, solid-state drives, or other data storage devices. As discussed in detail below, the data storage 130 may store translation mappings.

In some embodiments, the host service device 102 may include one or more peripheral devices 132. The peripheral devices 132 may include any number of additional peripheral or interface devices, such as other input/output devices, storage devices, and so forth. The particular devices included in the peripheral devices 132 may depend on, for example, the type and/or configuration of the host service device 102, the client devices 104, and/or the hosted services provided by the host service device 102.

Each client device 104 may be embodied as any type of computation or computer device capable of communicating with the host service device 102 for hosting service and functions described herein, including, without limitation, a computer, a tablet computer, a smartphone, a laptop computer, a notebook, desktop computer, an Ultrabook™, a smart device, a personal digital assistant, a mobile Internet device, a wearable computing device, a network appliance, a distributed computing system, a processor-based system, a consumer electronic device, and/or other computing device. As such, each client device 104 may include components, such as a processor, memory, and communication subsystem, similar to those described above in regard to the host service device 102.

The network 106 may be embodied as any number of various wired and/or wireless networks capable of facilitating communications between the mobile compute device 102 and the remote service 104. For example, the network 106 may be embodied as, or otherwise include, a wired or wireless local area network (LAN), a wired or wireless wide area network (WAN), a cellular network, and/or a publicly-accessible, global network such as the Internet. As such, the network 106 may include any number of additional devices, such as additional computers, routers, and switches, to facilitate communications thereacross.

Figure 2:
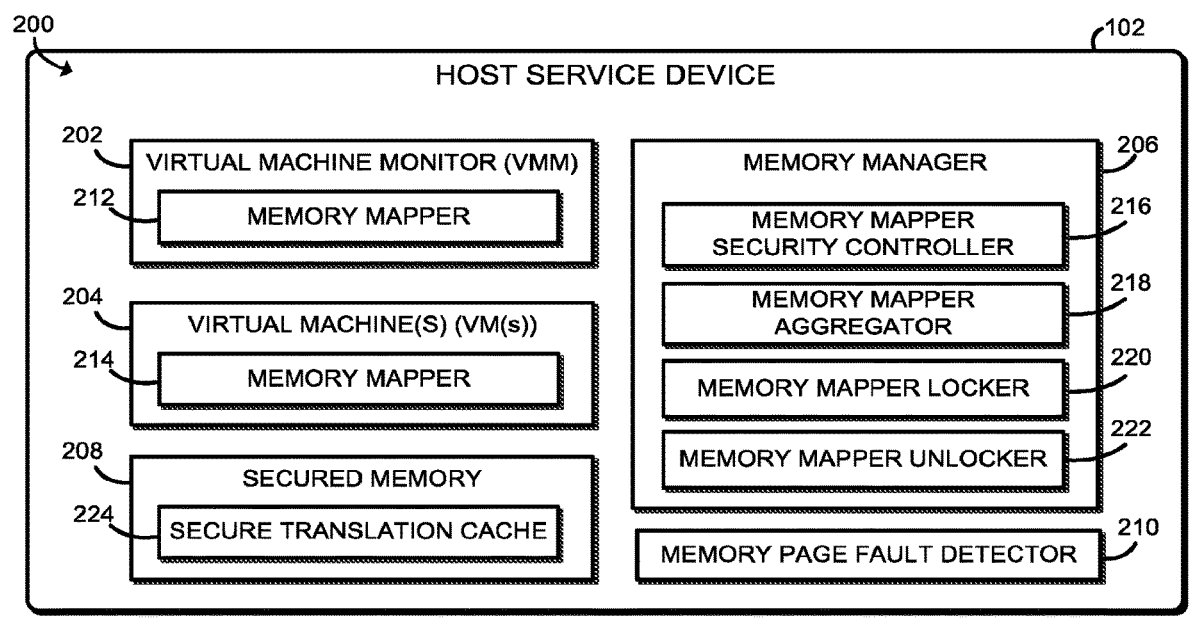
FIG. 2 is a simplified block diagram of at least one embodiment of various environments that may be established by the host service device of FIG. 1.

Referring now to FIG. 2, in use, the host service device 102 may establish an environment 200 for protecting virtual machine memory of virtual machines instantiated on the host service device 102. The illustrative environment 200 includes a virtual machine monitor (VMM) 202, one or more virtual machines (VMs) 204, a memory manager 206, a secured memory 208, and a memory page fault detector 210. Some of the components of the environment 200 may be embodied as hardware, firmware, software, or a combination thereof. As such, in some embodiments, one or more of the components of the environment 200 may be embodied as circuitry or collection of electrical devices (e.g., a memory manager circuit 206, a secured memory circuit 208, a memory page fault detector circuit 210, etc.). It should be appreciated that, in such embodiments, one or more of the memory manager circuit 206 and/or the memory page fault detector circuit 210 may form a portion of one or more of the compute engine 120, the processor 122, the I/O subsystem 126, the communication subsystem 128, and/or other components of the host service device 102. Additionally, in some embodiments, one or more of the illustrative components of the environment 200 may form a portion of another component and/or one or more of the illustrative components may be independent of one another. Further, in some embodiments, one or more of the components of the environment 200 may be embodied as virtualized hardware components or emulated architecture, which may be established and maintained by the compute engine 120 or other components of the host service device 102.

The virtual machine monitor (VMM) 202 is configured to instantiate the virtual machines 204 on the host service device. In doing so, the virtual machine monitor 202 is configured to establish a VMM page table to store a local translation mapping between guest physical addresses (GPA) and host physical addresses (HPA) and allocate a range of the guest physical addresses to virtual machine(s) 204 instantiated on the host service device 102. To do so, the virtual machine monitor 202 includes a memory mapper 212 that generates a mapping of guest physical addresses-to-host physical addresses for the guest physical address ranges that were assigned to the virtual machines 204. In other words, the virtual machine monitor 202 allocates a host physical address range to each virtual machine 204 by allocating the guest physical address range that is mapped to the corresponding host physical address range. In order to keep track of the virtual machine 204 with the assigned guest physical address range, the VMM page table further includes a virtual machine control structure (VMCS) identifier associated with each virtual machine 204 and generates a VMCS→GPA→HPA mapping 304 to be stored in the secured memory 208 as discussed in detail below. The VMCS identifier uniquely identifies each virtual machine 204 instantiated on the host service device 102.

As discussed above, in some cases, the virtual machine monitor 202 may be compromised or hacked and may attempt to maliciously change the generated translation mappings. To ensure that the host service device 102 is not maliciously compromised, the virtual memory of the virtual machines 204 is secured by copying the VMCS→GPA→HPA mapping 304 to the secured memory 208 as a secured translation mapping. Once the secured translation mapping of the guest physical addresses-to-host physical addresses is stored in the secured memory 208, the virtual machine monitor 202 cannot reassign the host physical address that has been allocated to the virtual machine 204 through the allocated guest physical address range. As such, the secured translation mapping of guest physical addresses-to-host physical addresses associated with the virtual machine 204 may not be accessed or modified until the virtual machine 204 releases or unlocks the allocated guest physical address range. Accordingly, only the virtual machine 204 may access the host physical addresses of the host service device 102 that correspond to the range of guest physical addresses allocated to the virtual machine 204.

Each virtual machine (VM) 204 is configured to execute associated software or otherwise provide cloud or hosted secured. Each virtual machine 204 establishes a VM page table to store a translation mapping between virtual linear addresses (LA) of the virtual machine and the guest physical addresses (GPA) of the range of guest physical addresses provided by the virtual machine monitor 202. To do so, the virtual machine 204 includes a memory mapper 214 that generates a LA→GPA mapping 302 that is used to translate a virtual linear address to a translated guest physical address.

The memory manager 206 is configured to manage memory requests from virtual machines 204, while providing security to the virtual memory of the virtual machines 204. To do so, the memory manager 206 includes a memory mapper security controller 216, a memory mapper aggregator 218, a memory mapper locker 220, and a memory mapper unlocker 222. In use, the memory manager 206 is configured to receive a memory access request, including a virtual linear address, from a virtual machine 204. In response to the memory access request, the memory manager 206 performs a translation of the virtual linear address to a translated host physical address of the host service device 102 using the VM page table associated with the requesting virtual machine and the VMM page table associated with the virtual machine monitor.

Figure 3:
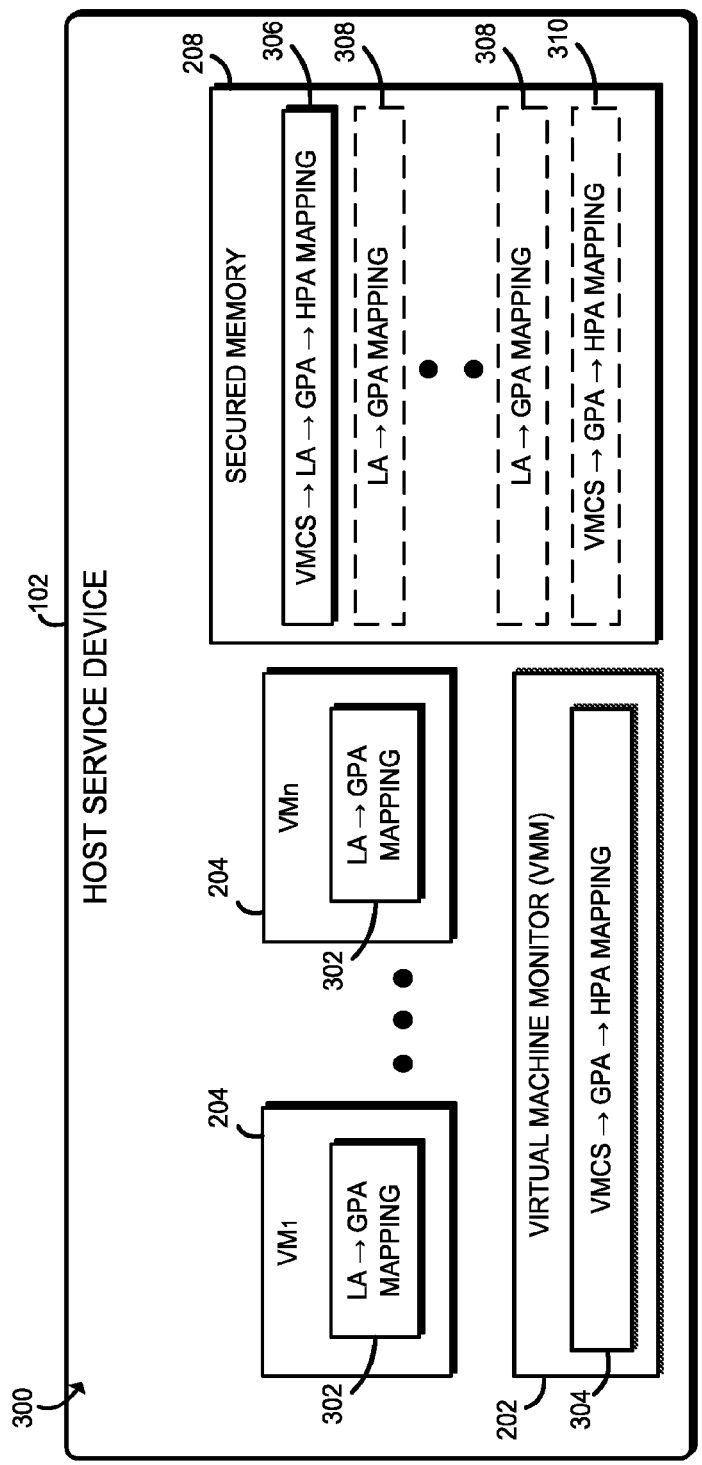
FIG. 3 is a simplified block diagram of at least one embodiment of various environments that may be established by the host service device of FIG. 1.

To provide security to the virtual memory of the virtual machines 204, the memory mapper security controller 216 is configured to verify the translation of the virtual linear address to the translated host physical address based on a comparison of the translated host physical address to a host physical address translated using the secured translation mapping stored in the secured memory 208. The memory mapper security controller 216 is further configured to control access to the secured memory 208, which stores one or more secured translation mappings (e.g., a locked VMCS→LA→GPA→HPA mapping 306, a locked LA→GPA mappings 308, and/or a locked VMCS→GPA→HPA mapping 310 as shown in FIG. 3). As discussed above, once the translation mappings are copied in the secured memory 208, the secured translation mappings 306, 308, 310 are not accessible to the virtual machine monitor 202 and the virtual machines 204.

The memory mapper aggregator 218 is, in some embodiments, configured to aggregate the LA→GPA mappings 302 generated by the virtual machines 204 and the VMCS→GPA→HPA mapping 304 generated by the virtual machine monitor 202 to generate a VMCS→LA→GPA→HPA mapping 306 (see FIG. 3). As discussed above, the VMCS→LA→GPA→HPA mapping 306 is used to verify a translation of a virtual linear address of a virtual machine 204 to a translated host physical address of the host service device 102 using the VM page table associated with the virtual machine 204 and the VMM page table associated with the virtual machine monitor 202.

Alternatively, in some embodiments, the memory mapper security controller 216 may verify the translated host physical address using a two-step process. First, memory mapper security controller 216 may use the locked LA→GPA mapping 308 stored in the secured memory 208 to verify a translation of a virtual linear address of a virtual machine 204 to a translated guest physical address using the VM page table associated with the requesting virtual machine 204. If the memory mapper security controller 216 determines that the translated guest physical address does not match the guest physical address translated using the locked LA→GPA mapping 308, the memory mapper security controller 216 may generate a security fault to perform a security function. If, however, the first translation is verified, the memory mapper security controller 216 may use the locked VMCS→GPA→HPA mapping 310 stored in the secured memory 208 to verify a translation of the translated guest physical address to a translated host physical address using the VMM page table associated with the virtual machine monitor 202. If the memory mapper security controller 216 determines that the translated host physical address does not match the host physical address translated using the locked VMCS→GPA→HPA mapping 310, the memory mapper security controller 216 may generate a security fault to perform a security function. As such, by verifying the secured translation mapping(s), the memory mapper security controller 216 may ensure that the virtual machine monitor 202 is not maliciously compromised.

The memory mapper locker 220 is configured to lock the secured translation mappings 306, 308, 310 that are stored in the secured memory 208. It should be appreciated that the secured translation mappings 306, 308, 310 that are locked in the secured memory 208 are inaccessible by the virtual machine monitor 202 and the virtual machines 204. In other words, the VMCS→LA→GPA→HPA mapping 306, the LA→GPA mapping(s) 308, and/or the VMCS→GPA→HPA mapping 310 (see FIG. 3) are not accessible to the virtual machine monitor 202 and the virtual machine(s) 204. To lock the secured translation mappings 306, 308, 310, the memory mapper locker 220 may set a status bit or flag or otherwise provide an indication associated with the locked secured translation mappings 306, 308, 310. In some embodiments, the mere presence of a secured translation mapping 306, 308, 310 in the secured memory 208 is an indication that the corresponding secured translation mapping 306, 308, 310 has been locked.

The memory mapper unlocker 222 is also configured to release one or more translation mappings from the secured memory 208, such that the virtual machine monitor 202 and/or one or more virtual machines 204 may access the unlocked translation mapping. To do so, the memory mapper unlocker 222 removes a translation mapping requested to be unlocked from the secured memory 208. As such, it should be appreciated that the VMCS→LA→GPA→HPA mapping 306 and/or the VMCS→GPA→HPA mapping 310 is not accessible to the virtual machine monitor 202 until the virtual machine 204 releases the range of the host physical addresses that were assigned to the virtual machine 204 by the virtual machine monitor 202.

The memory page fault detector 210 is configured to detect a memory page fault, which may occur during an address translation using the page tables associated with a virtual machine 204 or the virtual machine monitor 202. For example, the memory page fault detector 210 may detect a memory page fault when a translated physical address (e.g., a translated guest physical address and/or a translated host physical address) does not exist in a corresponding page table. For example, when the memory manager 206 translates a virtual linear address of a virtual machine 204 to a translated guest physical address, the memory page fault detector 210 determines whether the translated guest physical address is present in the VM page table associated with the virtual machine 204. If the translated guest physical address is not present in the VM page table, the memory page fault detector 210 generates a memory page fault. Additionally, when the memory manager 206 translates the translated guest physical address to a translated host physical address, the memory page fault detector 210 determines whether the translated host physical address is present in the VMM page table associated with the virtual machine monitor 202. If the translated host physical address is not present in the VM page table, the memory page fault detector 210 generates a memory page fault. In some embodiments, the memory page fault detector 210 may alert a user that the host service device 102 has been compromised.

The secured memory 208 is configured to store the secured translation mappings in a secure translation cache 224. As discussed above, the secured translation mappings include the translation mappings generated by the virtual machine monitor 202 and one or more virtual machines 204. In some embodiments, as discussed in more detail below, the mappings generated by the virtual machine monitor 202 and one or more virtual machines 204 (i.e., VMCS→GPA→HPA mapping 304 and LA→GPA mappings 302, respectively) may be aggregated into a single VMCS→LA→GPA→HPA mapping 306. Accordingly, as shown in FIG. 3, the secured memory 208 may store a VMCS→LA→GPA→HPA mapping 306. In other embodiments, the secured memory 208 may separately store one or more LA→GPA mappings 308 for each virtual machine 204 and the VMCS→GPA→HPA mapping 310.

Figure 4:
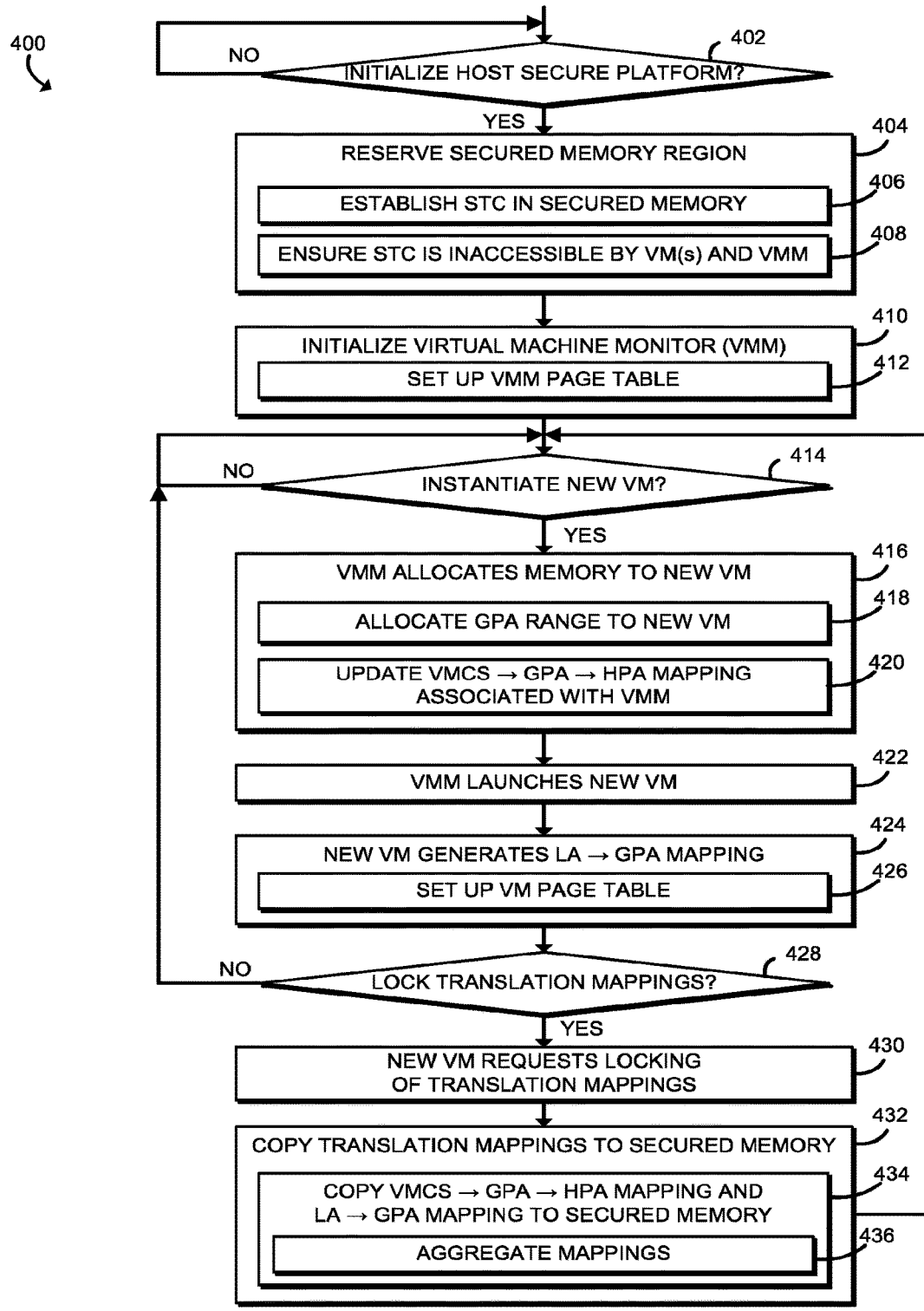
FIG. 4 is a simplified flow diagram of at least one embodiment of a method for initializing a host secure platform by storing translation mappings in a secured memory that may be executed by the host service device of FIGS. 1-3.

Referring now to FIG. 4, in use, the host service device 102 may execute a method 400 for initializing a host secure platform of the host service device 102. As discussed above, the memory mapper security controller 216 stores and locks the secured translation mappings in the secured memory 208 such that the secured translation mappings are not accessible by the virtual machine monitor 202 and the virtual machines 204. The method 400 begins with block 402 in which the memory mapper security controller 216 of the host service device 102 determines whether to initialize the host secure platform of the host service device 102. If the memory mapper security controller 216 determines that initialization of the host secure platform is not desired, the method 400 loops back to block 402 to continue determining whether to initialize the host secure platform. If, however, the memory mapper security controller 216 determines to initialize the host secure platform, the method 400 advances to block 404.

In block 404, the memory mapper security controller 216 reserves a secured memory region of the host physical address space for storing the secure translations. To do so, in block 406, the memory mapper security controller 216 establishes the secure translation cache (STC) 224 in the secured memory 208. In block 408, the memory mapper security controller 216 ensures the secure translation cache 224 is inaccessible by the virtual machine(s) 204 and the virtual machine monitor 202. For example, in some embodiments, the memory mapper security controller 216 may ensure that the host physical address space of the secure translation cache 224 cannot be mapped by the virtual machine monitor 202 or the virtual machines 204. In some embodiments, the secured memory region may be established in a secured container or other security provision.

In block 410, the memory mapper security controller 216 initializes the virtual machine monitor 202. To do so, in block 412, the memory mapper security controller 216 establishes a VMM page table that stores a mapping between guest physical addresses (GPA) and host physical addresses (HPA).

In block 414, the virtual machine monitor 202 determines whether to instantiate a new virtual machine (VM). If, the virtual machine monitor 202 determines not to instantiate a new virtual machine 204, the method 400 loops back to block 414 to continue determining whether to instantiate a new virtual machine 204. If, however, the virtual machine monitor 202 determines to instantiate a new virtual machine 204, the method 400 advances to block 416.

In block 416, the virtual machine monitor 202 allocates the host memory to the new virtual machine 204. To do so, in block 418, the virtual machine monitor 202 allocates a range of the guest physical addresses to the new virtual machine 204. In block 420, the virtual machine monitor 202 updates a VMCS→GPA→HPA mapping 304 of the virtual machine monitor 202 with the new allocation of the guest physical address range to the new virtual machine 204. To do so, the virtual machine monitor 202 generates a mapping of guest physical addresses-to-host physical addresses for the range of guest physical addresses that was allocated to the new virtual machine 204. The virtual machine monitor 202 updates the VMCS→GPA→HPA mapping 304 with the new mapping of the allocated guest physical address range of the new virtual machine 204 and the virtual machine control structure (VMCS) identifier associated with the new virtual machine 204. As discussed above, the virtual machine control structure identifier uniquely identifies the corresponding virtual machine.

In block 422, the virtual machine monitor 202 launches the new virtual machine 204. In block 424, the new virtual machine 204 generates a LA→GPA mapping 302 for the guest physical address range allocated to the new virtual machine 204 by the virtual machine monitor 202. To do so, in block 426, the new virtual machine 204 establishes a VM page table that stores a translation mapping of the virtual linear addresses-to-guest physical addresses associated with the new virtual machine 204.

In block 428, the memory mapper security controller 216 determines whether to lock the translation mappings (i.e., the VMCS→GPA→HPA mapping 304 and the LA→GPA mapping 302). If the memory mapper security controller 216 determines not to lock the translation mappings, the method 400 loops back to block 414 to continue determining whether to instantiate a new virtual machine 204. If, however, the memory mapper security controller 216 determines to lock the translation mappings, the method 400 advances to block 430.

In block 430, the new virtual machine 204 requests a locking of the translation mappings. In response to receiving a locking request from the new virtual machine 204, the memory mapper security controller 216 copies the translation mappings to the secured memory 208 in block 432. To do so, the memory mapper security controller 216 copies the LA→GPA mapping 302 of the new virtual machine 204 and the VMCS→GPA→HPA mapping 304 of the virtual machine monitor 202 to the secured memory 208.

In the illustrative embodiment, the memory mapper aggregator 218 of the memory mapper security controller 216 may aggregate the LA→GPA mappings 302 of the instantiated virtual machine(s) 204 and the VMCS→GPA→HPA mapping 304 of the virtual machine monitor 202 into a VMCS→LA→GPA→HPA mapping 306 and store the aggregated mapping 306 in the secured memory 208. It should be appreciated that the VMCS→LA→GPA→HPA mapping 306 is locked in the secured memory 208 and is not accessible to the virtual machine monitor 202 or the virtual machine(s) 204.

As discussed above and shown in FIG. 3, the LA→GPA mappings 302 and the VMCS→GPA→HPA mapping 304 may be individually copied and stored in the secured memory 208 in some embodiments. In such embodiments, once the translation mappings 302, 304 are copied in the secured memory 208, the memory mapper security controller 216 locks the translation mappings 308, 310, such that the locked LA→GPA mapping 308 and the locked VMCS→GPA→HPA mapping 310 are not accessible to the virtual machine monitor 202 or the virtual machine(s) 204. In such embodiments, the LA→GPA mapping 302 of the VM page table is initially the same as the locked LA→GPA mapping 308 stored in the secured memory 208, and the VMCS→GPA→HPA mapping 304 of the VMM page table is initially the same as the locked VMCS→GPA→HPA mapping 310 stored in the secured memory 208. However, the virtual machine monitor 202 may be maliciously compromised and may attempt to change the translation mappings. As such, any inconsistencies between the page tables and the secured translation mappings stored in the secured memory 208 may lead to a security fault, which may indicate that the host service device 102 has been compromised as discussed in more detail below.

Figure 5:
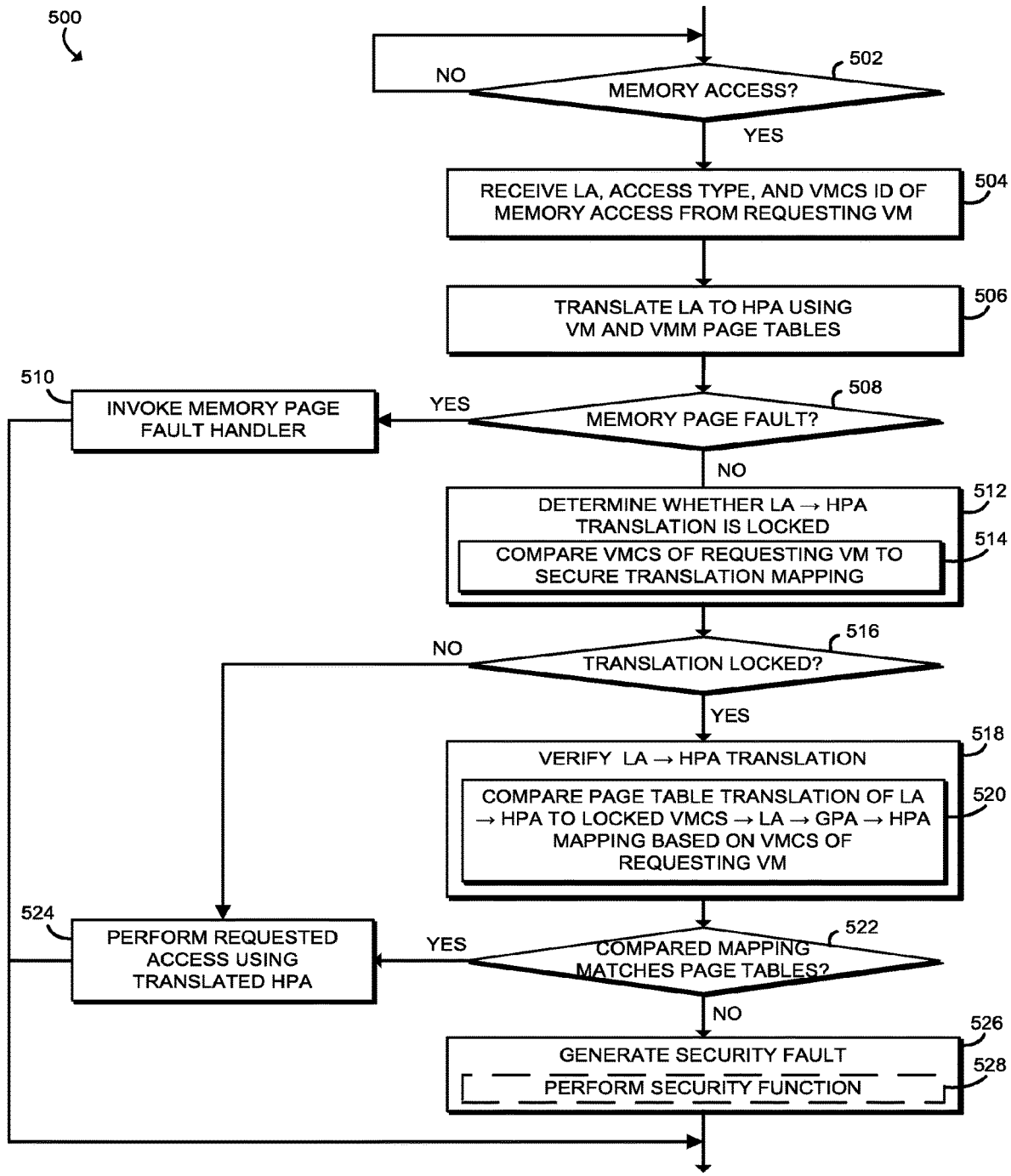
FIG. 5 is a simplified flow diagram of at least one embodiment of a method for accessing memory of the host service device in response to receiving a memory access request from a virtual machine that may be executed by the host service device of the system of FIGS. 1-3.

Referring now to FIG. 5, in use, the host service device 102 may execute a method 500 for accessing host physical memory of the host service device in response to receiving a memory access request from a virtual machine 204. The method 500 may be executed, for example, after initializing the host secure platform of the host service device 102, as described above in connection with FIG. 4. The method 500 begins with block 502 in which the host service device 102 of the host service device 102 determines whether a memory access request from a virtual machine 204 has been received by the memory manager 206. If not, the method 500 loops back to block 502 to continue waiting for a memory access request to be received from a virtual machine 204. If, however, the host service device 102 determines that a memory access request has been received, the method 500 advances to block 504. In block 504, host service device 102 receives a virtual linear address (LA), an access type, and a VMCS ID (i.e., the VM identifier) associated with the memory access from the requesting virtual machine 204.

In block 506, the host service device 102 translates the virtual linear address of the memory access request to a corresponding host physical address using the VM page table associated with the requesting virtual machine 204 and the VMM page table associated with the virtual machine monitor 202. To do so, in some embodiments, the host service device 102 translates the virtual linear address of the memory access request to a translated guest physical address using the VM page table and further translates the translated guest physical address to a host physical address using the VMM page table. During the translation process, the host service device 102 determines whether the requested virtual linear address is mapped in the VM page table of the requesting virtual machine 204 and whether the translated guest physical address is mapped in the VMM page table. If the host service device 102 determines that the virtual linear address of the memory access request is not present in the VM page table and/or the translated guest physical address is not present in the VMM page table, the host service device 102 raises a memory page fault in block 508, and the method 500 advances to block 510. In block 510, the host service device 102 invokes a memory page fault handler, which may perform one or more fault handling procedures.

If, however, the host service device 102 determines that there is no memory page fault, the method 500 advances to block 512. In block 512, the host service device 102 determines whether the virtual linear address to host physical address translation mapping is locked. To do so, in block 514, the host service device 102 may compare the VMCS identifier of the requesting virtual machine 204 to the secured translation mapping(s) stored in the secured memory 208 (e.g., VMCS→LA→GPA→HPA mapping 306) to determine whether the virtual linear address is presently stored in the secured memory 208. In block 516, if the host service device 102 determines that the translation mapping is not locked, the method 500 skips ahead to block

524, in which the host service device 102 performs the requested memory access using the translated host physical address.

If, however, the host service device 102 determines that the translation mapping is locked, the method 500 advances to block 518. In block 518, the host service device 102 verifies the virtual linear address to host physical address translation. To do so, in block 520, the host service device 102 compares the page table translation of virtual linear address to host physical address to the locked VMCS→LA→GPA→HPA mapping 306 stored in the secured memory 208 based on the VMCS identification of the requesting virtual machine 204. In some embodiments, the host service device 102 may compare the translated host physical address obtained using the VM and VMM page tables to a host physical address translated using the VMCS→LA→GPA→HPA mapping 306. Alternatively or additionally, in some embodiments, the entire VM and VMM page tables may be compared to the VMCS→LA→GPA→HPA mapping 306 to verify the translation.

In block 522, the host service device 102 determines whether the VMCS→LA→GPA→HPA mapping 306 matches the VM and VMM page tables. For example, the host service device 102 may determine whether the translated host physical address is the same as the host physical address translated using the VMCS→LA→GPA→HPA mapping 306. If the host service device 102 determines the translated host physical address is the same as the host physical address translated using the VMCS→LA→GPA→HPA mapping 306, the method 500 advances to block 524, in which the host service device 102 performs the requested memory access using the translated host physical address.

Alternatively or additionally, in some embodiments as mentioned above, the host service device 102 may determine whether the entire VM and VMM page tables matches the VMCS→LA→GPA→HPA mapping 306 stored in the secured memory 208. If the host service device 102 determines the entire VM and VMM page tables is the same as the VMCS→LA→GPA→HPA mapping 306, the method 500 advances to block 524, in which the host service device 102 performs the requested memory access using the translated host physical address.

If, however, the host service device 102 determines that the translated host physical address is different from the host physical address translated using the VMCS→LA→GPA→HPA mapping 306 or that the VMCS→LA→GPA→HPA mapping 306 is different from the VM and VMM page tables, the method 500 advances to block 526 to generate a security fault. In doing so, in some embodiments in block 528, the host service device 102 may perform a security function. For example, the host service device 102 may notify a user that the host service device 102 has been compromised.

Figure 6:
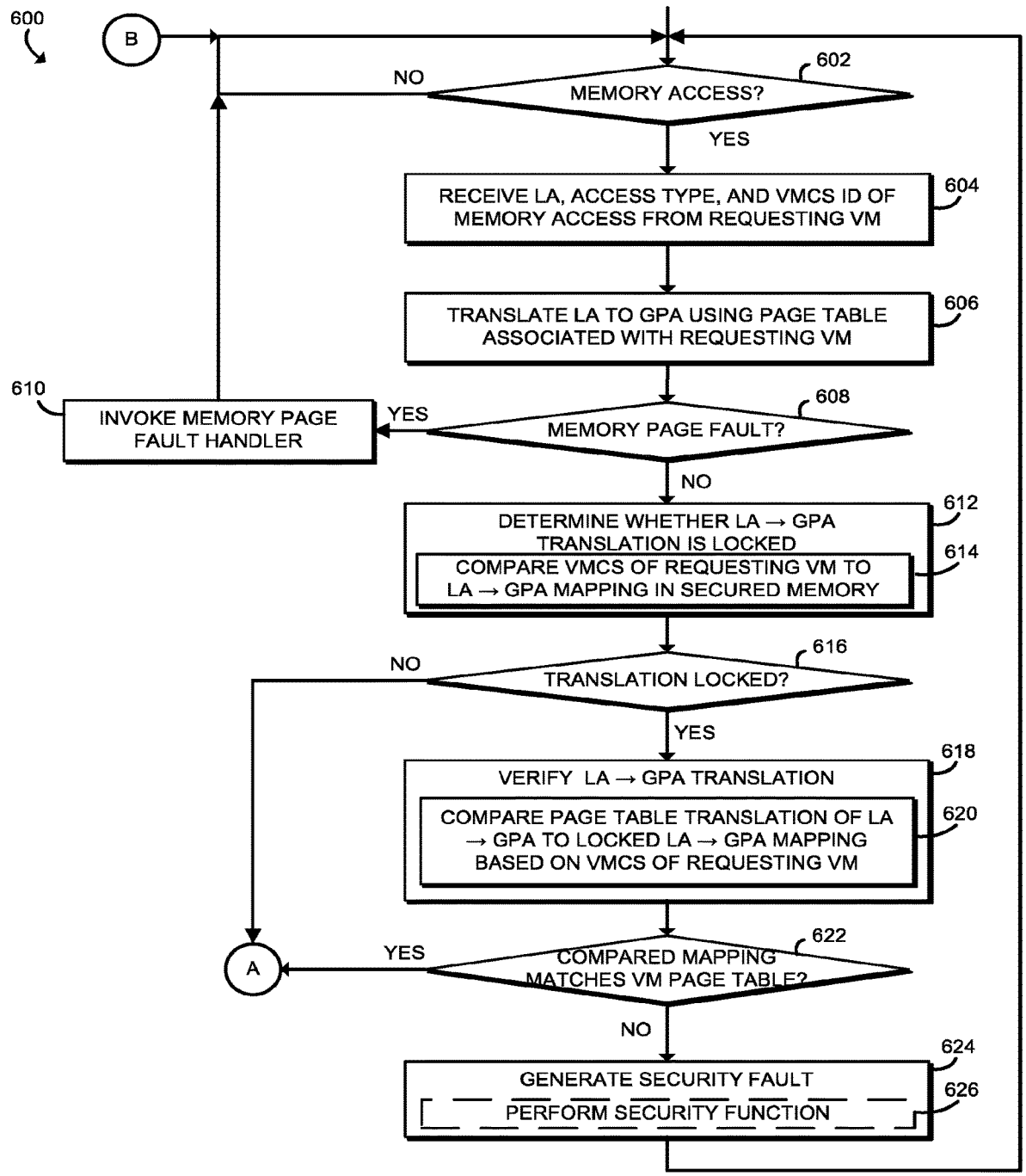
FIGS. 6 and 7 are a simplified flow diagram of at least one additional embodiment of a method for accessing memory of the host service device in response to receiving a memory access request from a virtual machine that may be executed by the host service device of the system of FIGS. 1-3.
Figure 7:
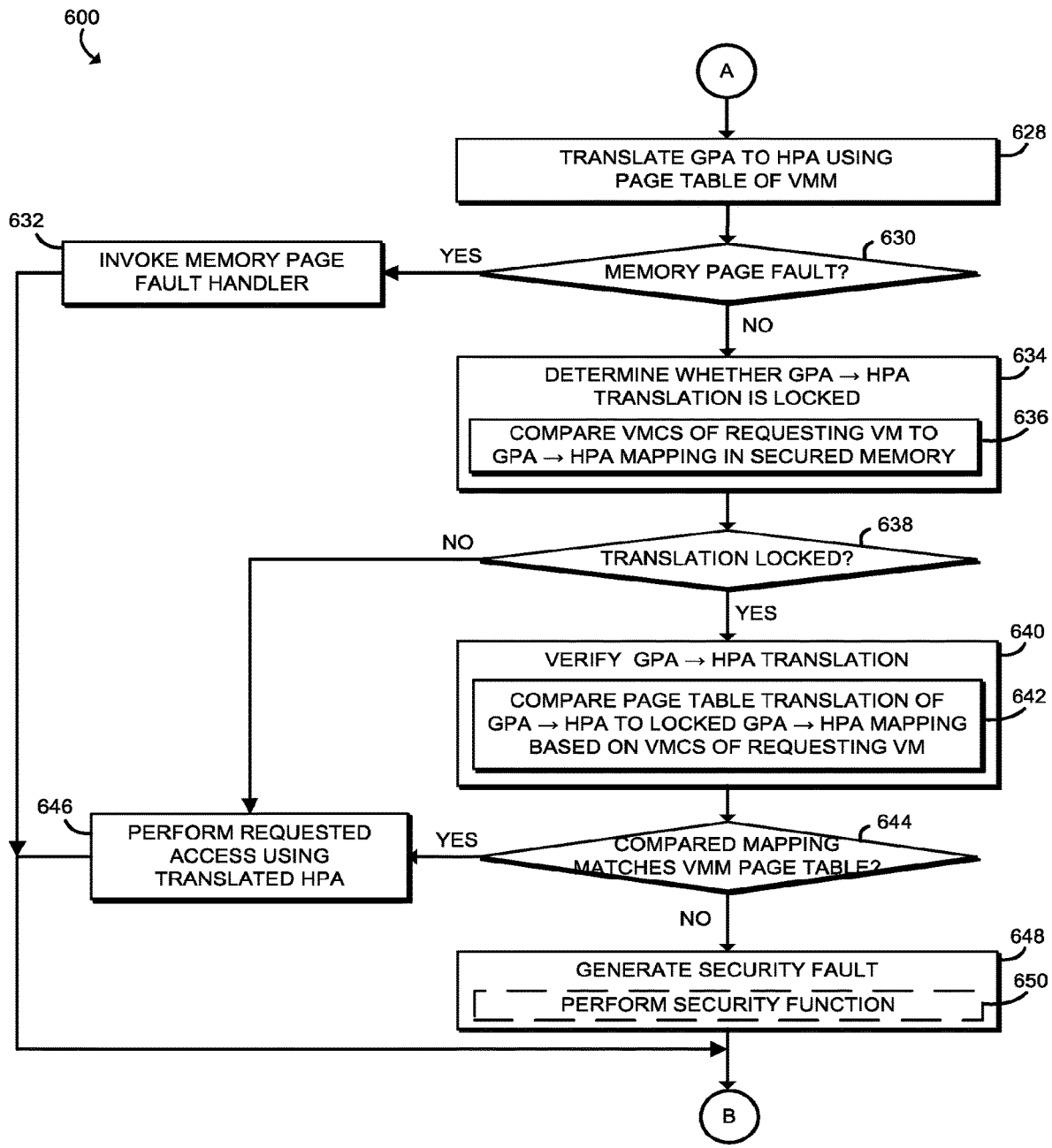

Referring now to FIGS. 6 and 7, in use, the host service device 102 may execute an alternative method 600 for accessing memory of the host service device in response to receiving a memory access request from a virtual machine 204. The method 600 may be executed, for example, after initializing the host secure platform of the host service device 102, as described above in connection with FIG. 4. The method 600 begins with block 602 in which the host service device 102 determines whether a memory access has been received. If not, the method 600 loops back to block 602 to continue waiting for a memory access request from a virtual machine 204. If, however, the host service device 102 determines that a memory access request has been received, the method 600 advances to block 604. In block 604, host service device 102 receives a virtual linear address (LA), an access type, and a VMCS ID (i.e., the VM identifier) associated with the memory access from the requesting virtual machine 204.

In block 606, the host service device 102 translates the virtual linear address of the memory access request to a corresponding guest physical address using the VM page table associated with the requesting virtual machine 204. During the translation process, the host service device 102 determines whether the requested virtual linear address is mapped in the VM page table. If the host service device 102 determines that the virtual linear address of the memory access request is not mapped in the VM page table, the host service device 102 raises a memory page fault in block 608, and the method 600 advances to block 610. In block 610, the host service device 102 invokes a memory page fault handler to handle the page fault, and the method 600 loops back to block 602 to monitor for a subsequent memory access request.

If, however, the host service device 102 determines that there is no memory page fault, the method 600 advances to block 612. In block 612, the host service device 102 determines whether the virtual linear address-to-guest physical address translation is locked. To do so, in block 614, the host service device 102 may compare the linear address and/or the VMCS identifier of the requesting virtual machine 204 to the locked LA→GPA mapping 308 stored in the secured memory 208 to determine whether the virtual linear address is presently stored in the secured memory 208. In block 616, if the host service device 102 determines that the translation is not locked, the method 600 skips ahead to block 628 of FIG. 7 to further translate the translated guest physical address to a host physical address as described further below.

If, however, the host service device 102 determines that the translation is locked, the method 600 advances to block 618. In block 618, the host service device 102 verifies the virtual linear address-to-guest physical address translation. To do so, in block 620, the host service device 102 compares the VM page table translation of virtual linear address to guest physical address to the locked LA→GPA mapping 308 based on the VMCS of the requesting virtual machine 204 or on the virtual linear address itself. For example, the host service device 102 may compare the translated guest physical address to a guest physical address translated using the secured translation mapping of virtual linear addresses-to-guest physical addresses (i.e., the LA→GPA mapping 308 stored in the secured memory 208). Additionally or alternatively, in some embodiments, the host service device 102 may compare the entire VM page table to the LA→GPA mapping 308 stored in the secured memory 208 to verify the translation.

In block 622, if the host service device 102 determines that the locked LA→GPA mapping 308 is different from the VM page table, the method 600 advances to block 624 to generate a security fault. In some embodiments in block 626, in response to determining that the verification has failed, the host service device 102 may perform a security function. For example, in some embodiments, the host service device 102 may notify a user that the host service device 102 has been compromised.

If, however, the host service device 102 that the locked LA→GPA mapping 308 matches the VM page table, the method 600 skips ahead to block 628 of FIG. 7. In block 628, the host service device 102 translates the translated guest physical address to a host physical address using the VMM page table. During the translation process, the host service device 102 determines whether the translated guest physical address is mapped in the VMM page table. If the host service device 102 determines that the translated guest physical address is not mapped in the VMM page table, the host service device 102 raises a memory page fault in block 630, and the method 600 advances to block 632. In block 632, the host service device 102 invokes a memory page fault handler to handle the fault, and the method 600 then loops back to block 602 to monitor for a subsequent memory access request.

If, however, the host service device 102 determines that there is no memory page fault, the method 600 advances to block 634. In block 634, the host service device 102 determines whether the translated guest physical address-to-host physical address translation is locked. To do so, in block 636, the host service device 102 compares the VMCS identifier of the requesting virtual machine 204 to the locked VMCS→GPA→HPA mapping 310 stored in the secured memory 208 to determine whether the translated guest physical address is presently stored in the in the secured memory 208.

In block 638, if the host service device 102 determines that the translation is not locked, the method 600 skips ahead to block 646 to perform the requested memory access using the translated host physical address. The method 600 then loops back to block 602 to monitor for a subsequent memory access request.

If, however, the host service device 102 determines that the translation is locked, the method 600 advances to block 640. In block 640, the host service device 102 verifies the translated guest physical address-to-host physical address translation. To do so, in block 642, the host service device 102 compares the VMM page table translation of guest physical address to host physical address to the locked VMCS→GPA→HPA mapping 310 based on the VMCS of the requesting virtual machine 204. For example, the host service device 102 may compare the translated host physical address to the host physical address translated using the secured translation mapping of guest physical addresses-to-host physical addresses (i.e., the VMCS→GPA→HPA mapping 310 stored in the secured memory 208). Additionally or alternatively, in some embodiments, the host service device 102 may compare the entire VMM page table to the VMCS→GPA→HPA mapping 310 stored in the secured memory 208 to verify the translation.

In block 644, if the host service device 102 determines that the locked VMCS→GPA→HPA mapping 310 is different from the VMM page table, the method 600 advances to block 648 to generate a security fault. To do so, in some embodiments in block 650, the host service device 102 may perform a security function. For example, in some embodiments, the host service device 102 may notify a user that the host service device 102 has been compromised.

If, however, the host service device 102 determines that the locked VMCS→GPA→HPA mapping 310 matches the VMM page table, the method 600 skips ahead to block 646 to perform the requested memory access using the translated host physical address. The method 600 then loops back to block 602 to monitor for a subsequent memory access request.

Figure 8:
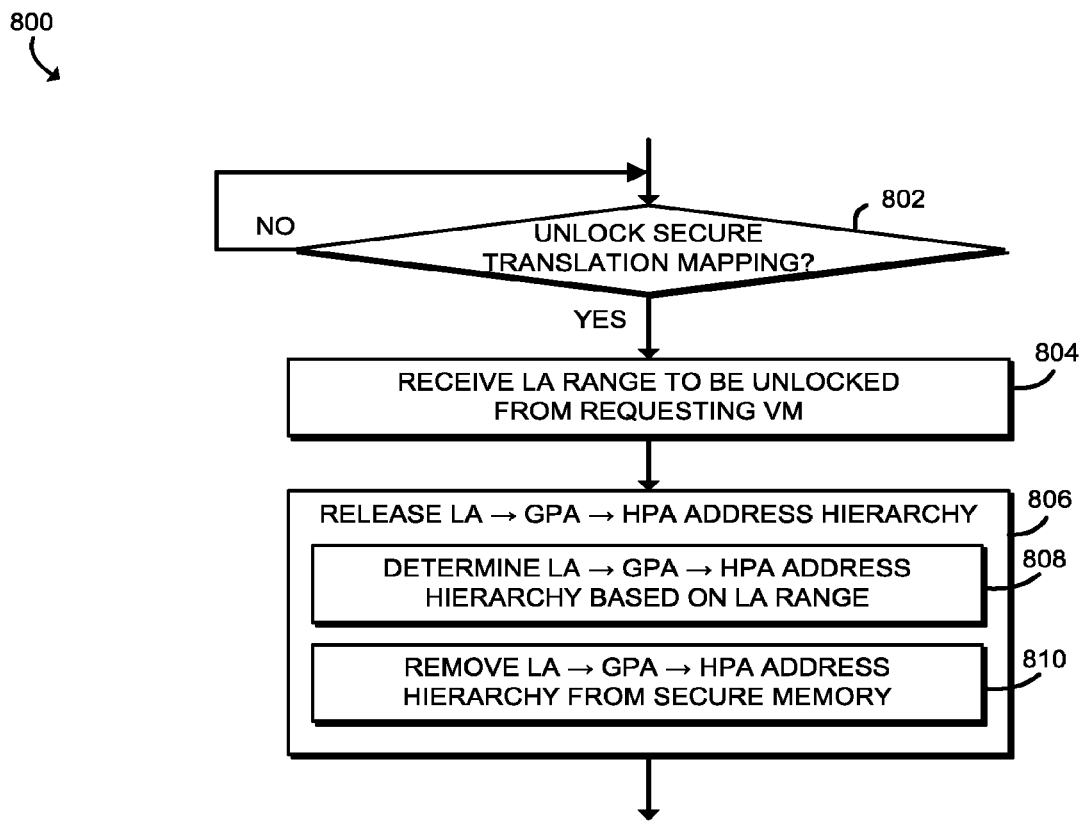
FIG. 8 is a simplified flow diagram of at least one embodiment of a method for unlocking secured translation mapping(s) stored in a secured memory of the host service device that may be executed by the host service device of the system of FIGS. 1-3.

Referring now to FIG. 8, in use, the host service device 102 may execute a method 800 for unlocking one or more secured translation mappings stored in the secure memory 208 in response to a receipt of a unlock request from a virtual machine 204. The method 800 may be executed, for example, after initializing the host secure platform of the host service device 102, as described above in connection with FIG. 4. The method 800 begins with block 802 in which the host service device 102 determines whether to unlock one or more secured translation mappings stored in the secured memory 208. If the host service device 102 determines an unlock request has not been received, the method 800 loops back to block 802 to continue waiting for a unlock request from a virtual machine 204. If, however, the host service device 102 determines that an unlock request has been received, the method 800 advances to block 804. In block 804, the host service device 102 receives, in response to receiving the unlock request, a range of virtual linear addresses to be unlocked from the requesting virtual machine 204.

In block 806, the host service device 102 releases the LA→GPA→HPA address hierarchy by removing any secured translation mapping associated with the requesting virtual machine 204 from the secured memory 208. To do so, in block 808, the host service device 102 determines the LA→GPA→HPA address hierarchy based on the range of virtual linear addresses to be unlocked, which is associated with the requesting virtual machine 204. In block 810, the host service device 102 removes the LA→GPA→HPA address hierarchy from the secured memory 208. For example, the host service device 102 removes the secured translation mapping of virtual linear addresses-to-host physical addresses that corresponds to the range of virtual linear addresses from the secured memory 208.

EXAMPLES

Illustrative examples of the technologies disclosed herein are provided below. An embodiment of the technologies may include any one or more, and any combination of, the examples described below.

Example 1 includes a compute device for protecting virtual machine memory of the compute device, the compute device comprising a secured memory; and a memory manager to (i) receive, from a virtual machine instantiated on the compute device by a virtual machine monitor of the compute device, a memory access request that includes a virtual linear address, (ii) perform a translation of the virtual linear address to a translated host physical address of the compute device using a page table associated with the requesting virtual machine and a page table associated with the virtual machine monitor, (iii) determine whether a secured translation mapping of virtual linear addresses-to-host physical addresses that corresponds to the virtual linear address is locked, wherein the secured translation mapping is stored in the secured memory, (iv) verify, in response to a determination that the secured translation mapping is locked, the translation based on a comparison of the translated host physical address to a host physical address translated using the secured translation mapping, and (v) perform the memory access request using the translated host physical address in response to verification of the translation.

Example 2 includes the subject matter of Example 1, and wherein the secured translation mapping includes a secured translation mapping of virtual linear addresses-to-guest physical addresses, and wherein to perform the translation comprises to perform a first translation of the virtual linear address to a translated guest physical address using the page table associated with the requesting virtual machine, to determine whether the secured translation mapping is locked comprises to determine whether the secured translation mapping of virtual linear addresses-to-guest physical addresses is locked; and to verify the translation comprises to verify the first translation based on a comparison of the translated guest physical address to a guest physical address translated using the secured translation mapping of virtual linear addresses-to-guest physical addresses.

Example 3 includes the subject matter of any of Examples 1 and 2, and wherein the memory manager is further to generate a security fault in response to a determination that the translated guest physical address does not match the guest physical address translated using the secured translation mapping of virtual linear addresses-to-guest physical addresses.

Example 4 includes the subject matter of any of Examples 1-3, and wherein to generate the security fault comprises to perform a security function in response to the determination that the translated guest physical address does not match the guest physical address translated using the secured translation mapping of virtual linear addresses-to-guest physical addresses.

Example 5 includes the subject matter of any of Examples 1-4, and wherein the secured translation mapping includes a secured translation mapping of guest physical addresses-to-host physical addresses, and wherein to perform the translation comprises to perform, in response to verification of the first translation, a second translation of the translated guest physical address to the translated host physical address using the page table associated with the virtual machine monitor, to determine whether the secured translation mapping is locked comprises to determine whether the secured translation mapping of guest physical addresses-to-host physical addresses is locked; and to verify the translation comprises to verify the second translation based on a comparison of the translated host physical address to a host physical address translated using the secured translation mapping of guest physical addresses-to-host physical addresses.

Example 6 includes the subject matter of any of Examples 1-5, and wherein the memory manager is further to generate a security fault in response to a determination that the translated host physical address does not match the host physical address translated using the secured translation mapping of guest physical addresses-to-host physical addresses.

Example 7 includes the subject matter of any of Examples 1-6, and wherein to generate the security fault comprises to perform a security function in response to the determination that the translated host physical address does not match the host physical address translated using the secured translation mapping of guest physical addresses-to-host physical addresses.

Example 8 includes the subject matter of any of Examples 1-7, and wherein to determine whether the secured translation mapping is locked comprises to determine whether a translation of virtual linear addresses-to-host physical addresses that corresponds to the virtual linear address is presently stored in the secured memory.

Example 9 includes the subject matter of any of Examples 1-8, and wherein to verify the translation comprises to translate the virtual linear address to a host physical address using the secured translation mapping based on an identifier of the virtual machine.

Example 10 includes the subject matter of any of Examples 1-9, and wherein the memory manager is further to generate a security fault in response to a determination that the translated host physical address does not match the host physical address translated using the secured translation.

Example 11 includes the subject matter of any of Examples 1-10, and wherein to generate the security fault comprises to perform a security function in response to the determination that the translated host physical address does not match the host physical address translated using the secured translation.

Example 12 includes the subject matter of any of Examples 1-11, and wherein the virtual machine monitor is further to allocate a guest physical address range to the virtual machine and generate a first mapping of guest physical addresses-to-host physical addresses for the virtual machine; the virtual machine is further to generate a second mapping of virtual linear addresses-to-the guest physical addresses; and the memory manager is further to aggregate the first mapping and second mapping to form a third mapping of virtual linear address-to-guest physical addresses-to-host physical address and store the third mapping in the secured memory as the secured translation mapping.

Example 13 includes the subject matter of any of Examples 1-12, and wherein the third mapping is indexed based on an identifier of each virtual machine instantiated on the compute device.

Example 14 includes the subject matter of any of Examples 1-13, and wherein the virtual machine monitor is further to allocate a guest physical address range to the virtual machine and generate a first mapping of guest physical addresses-to-host physical addresses for the virtual machine; the virtual machine is further to generate a second mapping of virtual linear addresses-to-the guest physical addresses; and the memory manger is further to store the first and second mappings in the secured memory as the secured translation mapping.

Example 15 includes the subject matter of any of Examples 1-14, and wherein the first mapping is indexed based on an identifier of each virtual machine instantiated on the compute device.

Example 16 includes the subject matter of any of Examples 1-15, and wherein the memory manger is further to receive, from the virtual machine, a range of linear addresses to be unlocked; and remove a mapping of virtual linear addresses-to-host physical addresses that corresponds to the virtual linear address from the secured memory.

Example 17 includes the subject matter of any of Examples 1-16, and wherein to remove the mapping of virtual linear addresses-to-host physical addresses comprises to determine an address hierarchy indicative of linear address-to-guest physical address-to-host physical address mappings based on the range of linear addresses to be unlocked, and to remove the mapping of virtual linear addresses-to-host physical addresses comprises to remove the address hierarchy from the secured memory.

Example 18 includes a method for protecting virtual machine memory of a compute device, the method comprising receiving, from a virtual machine instantiated on the compute device, a memory access request that includes a virtual linear address; performing, by the compute device, a translation of the virtual linear address to a translated host physical address of the compute device using a page table associated with the requesting virtual machine and a page table associated with a virtual machine monitor established on the compute device; determining, by the compute device, whether a secured translation mapping of virtual linear addresses-to-host physical addresses that corresponds to the virtual linear address is locked, wherein the secured translation mapping is stored in a secured memory of the compute device; verifying, by the compute device and in response to a determination that the secured translation mapping is locked, the translation based on a comparison of the translated host physical address to a host physical address translated using the secured translation mapping; and performing, by the compute device, the memory access request using the translated host physical address in response to verification of the translation.

Example 19 includes the subject matter of Example 18, and wherein the secured translation mapping includes a secured translation mapping of virtual linear addresses-to-guest physical addresses, and wherein performing the translation comprises performing a first translation of the virtual linear address to a translated guest physical address using the page table associated with the requesting virtual machine, determining whether the secured translation mapping is locked comprises determining whether the secured translation mapping of virtual linear addresses-to-guest physical addresses is locked; and verifying the translation comprises verifying the first translation based on a comparison of the translated guest physical address to a guest physical address translated using the secured translation mapping of virtual linear addresses-to-guest physical addresses.

Example 20 includes the subject matter of any of Examples 18 and 19, and further including generating, by the compute device, a security fault in response to a determination that the translated guest physical address does not match the guest physical address translated using the secured translation mapping of virtual linear addresses-to-guest physical addresses.

Example 21 includes the subject matter of any of Examples 18-20, and wherein generating the security fault comprises performing, by the compute device, a security function in response to the determination that the translated guest physical address does not match the guest physical address translated using the secured translation mapping of virtual linear addresses-to-guest physical addresses.

Example 22 includes the subject matter of any of Examples 18-21, and wherein the secured translation mapping includes a secured translation mapping of guest physical addresses-to-host physical addresses, and wherein performing the translation comprises performing, in response to verification of the first translation, a second translation of the translated guest physical address to the translated host physical address using the page table associated with the virtual machine monitor, determining whether the secured translation mapping is locked comprises determining whether the secured translation mapping of guest physical addresses-to-host physical addresses is locked; and verifying the translation comprises verifying the second translation based on a comparison of the translated host physical address to a host physical address translated using the secured translation mapping of guest physical addresses-to-host physical addresses.

Example 23 includes the subject matter of any of Examples 18-22, and further including generating, by the compute device, a security fault in response to a determination that the translated host physical address does not match the host physical address translated using the secured translation mapping of guest physical addresses-to-host physical addresses.

Example 24 includes the subject matter of any of Examples 18-23, and wherein generating the security fault comprises performing, by the compute device, a security function in response to the determination that the translated host physical address does not match the host physical address translated using the secured translation mapping of guest physical addresses-to-host physical addresses.

Example 25 includes the subject matter of any of Examples 18-24, and wherein determining whether the secured translation mapping is locked comprises determining whether a translation of virtual linear addresses-to-host physical addresses that corresponds to the virtual linear address is presently stored in the secured memory.

Example 26 includes the subject matter of any of Examples 18-25, and wherein verifying the translation comprises translating the virtual linear address to a host physical address using the secured translation mapping based on an identifier of the virtual machine.

Example 27 includes the subject matter of any of Examples 18-26, and further including generating, by the compute device, a security fault in response to a determination that the translated host physical address does not match the host physical address translated using the secured translation.

Example 28 includes the subject matter of any of Examples 18-27, and wherein generating the security fault comprises performing, by the compute device, a security function in response to the determination that the translated host physical address does not match the host physical address translated using the secured translation.

Example 29 includes the subject matter of any of Examples 18-28, and further including allocating, by the virtual machine monitor, a guest physical address range to the virtual machine; generating, by the virtual machine monitor, a first mapping of guest physical addresses-to-host physical addresses for the virtual machine; generating, by the virtual machine, a second mapping of virtual linear addresses-to-the guest physical addresses; aggregating, by the compute device, the first mapping and second mapping to form a third mapping of virtual linear address-to-guest physical addresses-to-host physical address; and storing, by the compute device, the third mapping in the secured memory as the secured translation mapping.

Example 30 includes the subject matter of any of Examples 18-29, and wherein the third mapping is indexed based on an identifier of each virtual machine instantiated on the compute device.

Example 31 includes the subject matter of any of Examples 18-30, and further including allocating, by the virtual machine monitor, a guest physical address range to the virtual machine; generating, by the virtual machine monitor, a first mapping of guest physical addresses-to-host physical addresses for the virtual machine; generating, by the virtual machine, a second mapping of virtual linear addresses-to-the guest physical addresses; and storing, by the compute device, the first and second mappings in the secured memory as the secured translation mapping.

Example 32 includes the subject matter of any of Examples 18-31, and wherein the first mapping is indexed based on an identifier of each virtual machine instantiated on the compute device.

Example 33 includes the subject matter of any of Examples 18-32, and further including receiving, from the virtual machine, a range of linear addresses to be unlocked; and removing a mapping of virtual linear addresses-to-host physical addresses that corresponds to the virtual linear address from the secured memory.

Example 34 includes the subject matter of any of Examples 18-33, and wherein removing the mapping of virtual linear addresses-to-host physical addresses comprises determining an address hierarchy indicative of linear address-to-guest physical address-to-host physical address mappings based on the range of linear addresses to be unlocked, wherein removing the mapping of virtual linear addresses-to-host physical addresses comprises removing the address hierarchy from the secured memory.

Example 35 includes one or more computer-readable media comprising a plurality of instructions stored thereon that, when executed, causes a compute device to perform the method of any of Examples 18-34.

Example 36 includes a compute device for protecting virtual machine memory of the compute device, the compute device comprising means for receiving, from a virtual machine instantiated on the compute device, a memory access request that includes a virtual linear address; means for performing a translation of the virtual linear address to a translated host physical address of the compute device using a page table associated with the requesting virtual machine and a page table associated with a virtual machine monitor established on the compute device; means for determining whether a secured translation mapping of virtual linear addresses-to-host physical addresses that corresponds to the virtual linear address is locked, wherein the secured translation mapping is stored in a secured memory of the compute device; means for verifying, in response to a determination that the secured translation mapping is locked, the translation based on a comparison of the translated host physical address to a host physical address translated using the secured translation mapping; and means for performing the memory access request using the translated host physical address in response to verification of the translation.

Example 37 includes the subject matter of Example 36, and wherein the secured translation mapping includes a secured translation mapping of virtual linear addresses-to-guest physical addresses, and wherein the means for performing the translation comprises means for performing a first translation of the virtual linear address to a translated guest physical address using the page table associated with the requesting virtual machine, the means for determining whether the secured translation mapping is locked comprises means for determining whether the secured translation mapping of virtual linear addresses-to-guest physical addresses is locked; and the means for verifying the translation comprises means for verifying the first translation based on a comparison of the translated guest physical address to a guest physical address translated using the secured translation mapping of virtual linear addresses-to-guest physical addresses.

Example 38 includes the subject matter of any of Examples 36 and 37, and further including means for generating a security fault in response to a determination that the translated guest physical address does not match the guest physical address translated using the secured translation mapping of virtual linear addresses-to-guest physical addresses.

Example 39 includes the subject matter of any of Examples 36-38, and wherein the means for generating the security fault comprises means for performing a security function in response to the determination that the translated guest physical address does not match the guest physical address translated using the secured translation mapping of virtual linear addresses-to-guest physical addresses.

Example 40 includes the subject matter of any of Examples 36-39, and wherein the secured translation mapping includes a secured translation mapping of guest physical addresses-to-host physical addresses, and wherein the means for performing the translation comprises means for performing, in response to verification of the first translation, a second translation of the translated guest physical address to the translated host physical address using the page table associated with the virtual machine monitor, the means for determining whether the secured translation mapping is locked comprises means for determining whether the secured translation mapping of guest physical addresses-to-host physical addresses is locked; and the means for verifying the translation comprises means for verifying the second translation based on a comparison of the translated host physical address to a host physical address translated using the secured translation mapping of guest physical addresses-to-host physical addresses.

Example 41 includes the subject matter of any of Examples 36-40, and further including means for generating a security fault in response to a determination that the translated host physical address does not match the host physical address translated using the secured translation mapping of guest physical addresses-to-host physical addresses.

Example 42 includes the subject matter of any of Examples 36-41, and wherein the means for generating the security fault comprises means for performing a security function in response to the determination that the translated host physical address does not match the host physical address translated using the secured translation mapping of guest physical addresses-to-host physical addresses.

Example 43 includes the subject matter of any of Examples 36-42, and wherein the means for determining whether the secured translation mapping is locked comprises means for determining whether a translation of virtual linear addresses-to-host physical addresses that corresponds to the virtual linear address is presently stored in the secured memory.

Example 44 includes the subject matter of any of Examples 36-43, and wherein the means for verifying the translation comprises translating the virtual linear address to a host physical address using the secured translation mapping based on an identifier of the virtual machine.

Example 45 includes the subject matter of any of Examples 36-44, and further including means for generating a security fault in response to a determination that the translated host physical address does not match the host physical address translated using the secured translation.

Example 46 includes the subject matter of any of Examples 36-45, and wherein the means for generating the security fault comprises means for performing a security function in response to the determination that the translated host physical address does not match the host physical address translated using the secured translation.

Example 47 includes the subject matter of any of Examples 36-46, and further including means for allocating a guest physical address range to the virtual machine; means for generating a first mapping of guest physical addresses-to-host physical addresses for the virtual machine; means for generating a second mapping of virtual linear addresses-to-the guest physical addresses; means for aggregating the first mapping and second mapping to form a third mapping of virtual linear address-to-guest physical addresses-to-host physical address; and means for storing the third mapping in the secured memory as the secured translation mapping.

Example 48 includes the subject matter of any of Examples 36-47, and wherein the third mapping is indexed based on an identifier of each virtual machine instantiated on the compute device.

Example 49 includes the subject matter of any of Examples 36-48, and further including means for allocating a guest physical address range to the virtual machine; means for generating a first mapping of guest physical addresses-to-host physical addresses for the virtual machine; means for generating a second mapping of virtual linear addresses-to-the guest physical addresses; and means for storing the first and second mappings in the secured memory as the secured translation mapping.

Example 50 includes the subject matter of any of Examples 36-49, and wherein the first mapping is indexed based on an identifier of each virtual machine instantiated on the compute device.

Example 51 includes the subject matter of any of Examples 36-50, and further including means for receiving, from the virtual machine, a range of linear addresses to be unlocked; and means for removing a mapping of virtual linear addresses-to-host physical addresses that corresponds to the virtual linear address from the secured memory.

Example 52 includes the subject matter of any of Examples 36-51, and wherein the means for removing the mapping of virtual linear addresses-to-host physical addresses comprises means for determining an address hierarchy indicative of linear address-to-guest physical address-to-host physical address mappings based on the range of linear addresses to be unlocked, wherein removing the mapping of virtual linear addresses-to-host physical addresses comprises removing the address hierarchy from the secured memory.

The invention claimed is:

1. A compute device for protecting virtual machine memory of the compute device, the compute device comprising:
a secured memory; and
a memory manager to (i) receive, from a virtual machine instantiated on the compute device by a virtual machine monitor of the compute device, a memory access request that includes a virtual linear address, (ii) perform a translation of the virtual linear address to a translated host physical address of the compute device using a page table associated with the requesting virtual machine and a page table associated with the virtual machine monitor, (iii) determine whether a secured translation mapping of virtual linear addresses-to-host physical addresses that corresponds to the virtual linear address is locked, wherein the secured translation mapping is stored in the secured memory, (iv) verify, in response to a determination that the secured translation mapping is locked, the translation based on a comparison of the translated host physical address to a host physical address translated using the secured translation mapping, and (v) perform the memory access request using the translated host physical address in response to verification of the translation.

2. The compute device of claim 1, wherein the secured translation mapping includes a secured translation mapping of virtual linear addresses-to-guest physical addresses, and wherein:
to perform the translation comprises to perform a first translation of the virtual linear address to a translated guest physical address using the page table associated with the requesting virtual machine,
to determine whether the secured translation mapping is locked comprises to determine whether the secured translation mapping of virtual linear addresses-to-guest physical addresses is locked; and
to verify the translation comprises to verify the first translation based on a comparison of the translated guest physical address to a guest physical address translated using the secured translation mapping of virtual linear addresses-to-guest physical addresses.

3. The compute device of claim 2, wherein the memory manager is further to generate a security fault in response to a determination that the translated guest physical address does not match the guest physical address translated using the secured translation mapping of virtual linear addresses-to-guest physical addresses.

4. The compute device of claim 2, wherein the secured translation mapping includes a secured translation mapping of guest physical addresses-to-host physical addresses, and wherein:
to perform the translation comprises to perform, in response to verification of the first translation, a second translation of the translated guest physical address to the translated host physical address using the page table associated with the virtual machine monitor,
to determine whether the secured translation mapping is locked comprises to determine whether the secured translation mapping of guest physical addresses-to-host physical addresses is locked; and
to verify the translation comprises to verify the second translation based on a comparison of the translated host physical address to a host physical address translated using the secured translation mapping of guest physical addresses-to-host physical addresses.

5. The compute device of claim 1, wherein to determine whether the secured translation mapping is locked comprises to determine whether a translation of virtual linear addresses-to-host physical addresses that corresponds to the virtual linear address is presently stored in the secured memory.

6. The compute device of claim 1, wherein to verify the translation comprises to translate the virtual linear address to a host physical address using the secured translation mapping based on an identifier of the virtual machine.

7. The compute device of claim 1, wherein:
the virtual machine monitor is further to allocate a guest physical address range to the virtual machine and generate a first mapping of guest physical addresses-to-host physical addresses for the virtual machine;
the virtual machine is further to generate a second mapping of virtual linear addresses-to-the guest physical addresses; and
the memory manager is further to aggregate the first mapping and second mapping to form a third mapping of virtual linear address-to-guest physical addresses-to-host physical address and store the third mapping in the secured memory as the secured translation mapping.

8. The compute device of claim 1, wherein:
the virtual machine monitor is further to allocate a guest physical address range to the virtual machine and generate a first mapping of guest physical addresses-to-host physical addresses for the virtual machine;
the virtual machine is further to generate a second mapping of virtual linear addresses-to-the guest physical addresses; and
the memory manger is further to store the first and second mappings in the secured memory as the secured translation mapping.

9. The compute device of claim 1, wherein the memory manger is further to:
receive, from the virtual machine, a range of linear addresses to be unlocked; and
remove a mapping of virtual linear addresses-to-host physical addresses that corresponds to the virtual linear address from the secured memory.

10. A method for protecting virtual machine memory of a compute device, the method comprising:
- receiving, from a virtual machine instantiated on the compute device, a memory access request that includes a virtual linear address;
- performing, by the compute device, a translation of the virtual linear address to a translated host physical address of the compute device using a page table associated with the requesting virtual machine and a page table associated with a virtual machine monitor established on the compute device;
- determining, by the compute device, whether a secured translation mapping of virtual linear addresses-to-host physical addresses that corresponds to the virtual linear address is locked, wherein the secured translation mapping is stored in a secured memory of the compute device;
- verifying, by the compute device and in response to a determination that the secured translation mapping is locked, the translation based on a comparison of the translated host physical address to a host physical address translated using the secured translation mapping; and
- performing, by the compute device, the memory access request using the translated host physical address in response to verification of the translation.

11. The method of claim 10, wherein the secured translation mapping includes a secured translation mapping of virtual linear addresses-to-guest physical addresses, and wherein:
- performing the translation comprises performing a first translation of the virtual linear address to a translated guest physical address using the page table associated with the requesting virtual machine,
- determining whether the secured translation mapping is locked comprises determining whether the secured translation mapping of virtual linear addresses-to-guest physical addresses is locked; and
- verifying the translation comprises verifying the first translation based on a comparison of the translated guest physical address to a guest physical address translated using the secured translation mapping of virtual linear addresses-to-guest physical addresses.

12. The method of claim 11, further comprising generating, by the compute device, a security fault in response to a determination that the translated guest physical address does not match the guest physical address translated using the secured translation mapping of virtual linear addresses-to-guest physical addresses.

13. The method of claim 11, wherein the secured translation mapping includes a secured translation mapping of guest physical addresses-to-host physical addresses, and wherein:
- performing the translation comprises performing, in response to verification of the first translation, a second translation of the translated guest physical address to the translated host physical address using the page table associated with the virtual machine monitor,
- determining whether the secured translation mapping is locked comprises determining whether the secured translation mapping of guest physical addresses-to-host physical addresses is locked; and
- verifying the translation comprises verifying the second translation based on a comparison of the translated host physical address to a host physical address translated using the secured translation mapping of guest physical addresses-to-host physical addresses.

14. The method of claim 10, wherein verifying the translation comprises translating the virtual linear address to a host physical address using the secured translation mapping based on an identifier of the virtual machine.

15. The method of claim 10, further comprising:
- allocating, by the virtual machine monitor, a guest physical address range to the virtual machine;
- generating, by the virtual machine monitor, a first mapping of guest physical addresses-to-host physical addresses for the virtual machine;
- generating, by the virtual machine, a second mapping of virtual linear addresses-to-the guest physical addresses;
- aggregating, by the compute device, the first mapping and second mapping to form a third mapping of virtual linear address-to-guest physical addresses-to-host physical address; and
- storing, by the compute device, the third mapping in the secured memory as the secured translation mapping.

16. The method of claim 10, further comprising:
- allocating, by the virtual machine monitor, a guest physical address range to the virtual machine;
- generating, by the virtual machine monitor, a first mapping of guest physical addresses-to-host physical addresses for the virtual machine;
- generating, by the virtual machine, a second mapping of virtual linear addresses-to-the guest physical addresses; and
- storing, by the compute device, the first and second mappings in the secured memory as the secured translation mapping.

17. The method of claim 10, further comprising:
- receiving, from the virtual machine, a range of linear addresses to be unlocked; and
- removing a mapping of virtual linear addresses-to-host physical addresses that corresponds to the virtual linear address from the secured memory.

18. One or more non-transitory, computer-readable media comprising a plurality of instructions stored thereon that, when executed, causes a compute device to:
- receive, from a virtual machine instantiated on the compute device, a memory access request that includes a virtual linear address;
- perform a translation of the virtual linear address to a translated host physical address of the compute device using a page table associated with the requesting virtual machine and a page table associated with a virtual machine monitor established on the compute device;
- determine whether a secured translation mapping of virtual linear addresses-to-host physical addresses that corresponds to the virtual linear address is locked, wherein the secured translation mapping is stored in a secured memory of the compute device;
- verify, in response to a determination that the secured translation mapping is locked, the translation based on a comparison of the translated host physical address to a host physical address translated using the secured translation mapping; and
- performing, by the compute device, the memory access request using the translated host physical address in response to verification of the translation.

19. The one or more non-transitory, computer-readable media of claim 18, wherein the secured translation mapping includes a secured translation mapping of virtual linear addresses-to-guest physical addresses, and wherein to:
- perform the translation comprises to perform a first translation of the virtual linear address to a translated guest physical address using the page table associated with the requesting virtual machine, determine whether the secured translation mapping is locked comprises to determine whether the secured translation mapping of virtual linear addresses-to-guest physical addresses is locked; and verify the translation comprises to verify the first translation based on a comparison of the translated guest physical address to a guest physical address translated using the secured translation mapping of virtual linear addresses-to-guest physical addresses.

20. The one or more non-transitory, computer-readable media of claim 11, wherein the plurality of instructions, when executed, further cause the compute device to generate a security fault in response to a determination that the translated guest physical address does not match the guest physical address translated using the secured translation mapping of virtual linear addresses-to-guest physical addresses.

21. The one or more non-transitory, computer-readable media of claim 11, wherein the secured translation mapping includes a secured translation mapping of guest physical addresses-to-host physical addresses, and wherein to:

perform the translation comprises to perform, in response to verification of the first translation, a second translation of the translated guest physical address to the translated host physical address using the page table associated with the virtual machine monitor, determine whether the secured translation mapping is locked comprises to determine whether the secured translation mapping of guest physical addresses-to-host physical addresses is locked; and verify the translation comprises to verify the second translation based on a comparison of the translated host physical address to a host physical address translated using the secured translation mapping of guest physical addresses-to-host physical addresses.

22. The one or more non-transitory, computer-readable media of claim 18, wherein to verify the translation comprises to translate the virtual linear address to a host physical address using the secured translation mapping based on an identifier of the virtual machine.

23. The one or more non-transitory, computer-readable media of claim 18, wherein the plurality of instructions, when executed, further cause the compute device to:

allocate, by the virtual machine monitor, a guest physical address range to the virtual machine;

generate, by the virtual machine monitor, a first mapping of guest physical addresses-to-host physical addresses for the virtual machine;

generate, by the virtual machine, a second mapping of virtual linear addresses-to-the guest physical addresses;

aggregate the first mapping and second mapping to form a third mapping of virtual linear address-to-guest physical addresses-to-host physical address; and store the third mapping in the secured memory as the secured translation mapping.

24. The one or more non-transitory, computer-readable media of claim 18, wherein the plurality of instructions, when executed, further cause the compute device to:

allocate, by the virtual machine monitor, a guest physical address range to the virtual machine;

generate, by the virtual machine monitor, a first mapping of guest physical addresses-to-host physical addresses for the virtual machine;

generate, by the virtual machine, a second mapping of virtual linear addresses-to-the guest physical addresses; and store the first and second mappings in the secured memory as the secured translation mapping.

25. The one or more non-transitory, computer-readable media of claim 18, wherein the plurality of instructions, when executed, further cause the compute device to:

receive, from the virtual machine, a range of linear addresses to be unlocked; and remove a mapping of virtual linear addresses-to-host physical addresses that corresponds to the virtual linear address from the secured memory.

26. A compute device for protecting virtual machine memory of the compute device, the compute device comprising:

means for receiving, from a virtual machine instantiated on the compute device, a memory access request that includes a virtual linear address;

means for performing a translation of the virtual linear address to a translated host physical address of the compute device using a page table associated with the requesting virtual machine and a page table associated with a virtual machine monitor established on the compute device;

means for determining whether a secured translation mapping of virtual linear addresses-to-host physical addresses that corresponds to the virtual linear address is locked, wherein the secured translation mapping is stored in a secured memory of the compute device;

means for verifying, in response to a determination that the secured translation mapping is locked, the translation based on a comparison of the translated host physical address to a host physical address translated using the secured translation mapping; and means for performing the memory access request using the translated host physical address in response to verification of the translation.

27. The compute device of claim 26, wherein the secured translation mapping includes a secured translation mapping of virtual linear addresses-to-guest physical addresses, and wherein:

the means for performing the translation comprises means for performing a first translation of the virtual linear address to a translated guest physical address using the page table associated with the requesting virtual machine, the means for determining whether the secured translation mapping is locked comprises means for determining whether the secured translation mapping of virtual linear addresses-to-guest physical addresses is locked; and the means for verifying the translation comprises means for verifying the first translation based on a comparison of the translated guest physical address to a guest physical address translated using the secured translation mapping of virtual linear addresses-to-guest physical addresses.

28. The compute device of claim 27, wherein the secured translation mapping includes a secured translation mapping of guest physical addresses-to-host physical addresses, and wherein:

the means for performing the translation comprises means for performing, in response to verification of the first translation, a second translation of the translated guest physical address to the translated host physical address using the page table associated with the virtual machine monitor, the means for determining whether the secured translation mapping is locked comprises means for determining whether the secured translation mapping of guest physical addresses-to-host physical addresses is locked; and the means for verifying the translation comprises means for verifying the second translation based on a comparison of the translated host physical address to a host physical address translated using the secured translation mapping of guest physical addresses-to-host physical addresses.

29. The compute device of claim 26, further comprising:

means for allocating a guest physical address range to the virtual machine;

means for generating a first mapping of guest physical addresses-to-host physical addresses for the virtual machine;

means for generating a second mapping of virtual linear addresses-to-the guest physical addresses;

means for aggregating the first mapping and second mapping to form a third mapping of virtual linear address-to-guest physical addresses-to-host physical address; and means for storing the third mapping in the secured memory as the secured translation mapping.

30. The compute device of claim 26, further comprising:

means for allocating a guest physical address range to the virtual machine;

means for generating a first mapping of guest physical addresses-to-host physical addresses for the virtual machine;

means for generating a second mapping of virtual linear addresses-to-the guest physical addresses; and means for storing the first and second mappings in the secured memory as the secured translation mapping.

31. The compute device of claim 26, further comprising:

means for receiving, from the virtual machine, a range of linear addresses to be unlocked; and means for removing a mapping of virtual linear addresses-to-host physical addresses that corresponds to the virtual linear address from the secured memory.

* * * * *